Aug. 23, 1966  W. N. POUNDSTONE  3,267,758
IDLER ROLLERS AND METHOD OF MAKING THE SAME
Filed Dec. 7, 1964  2 Sheets-Sheet 2
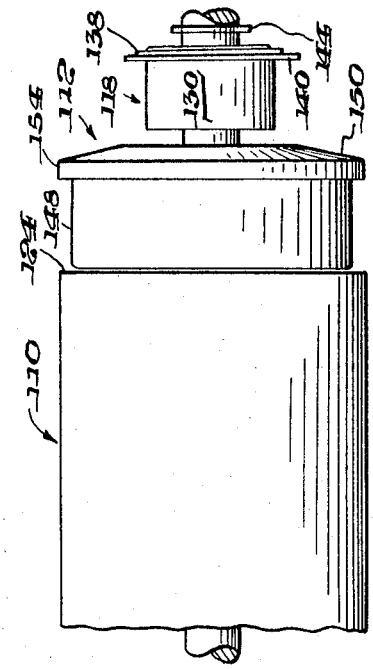
Fig. 3.
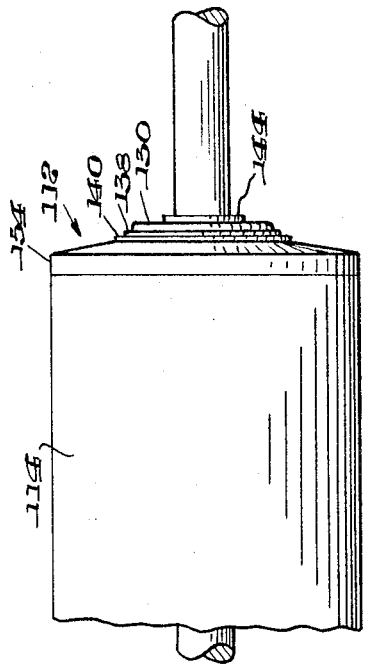
Fig. 4.
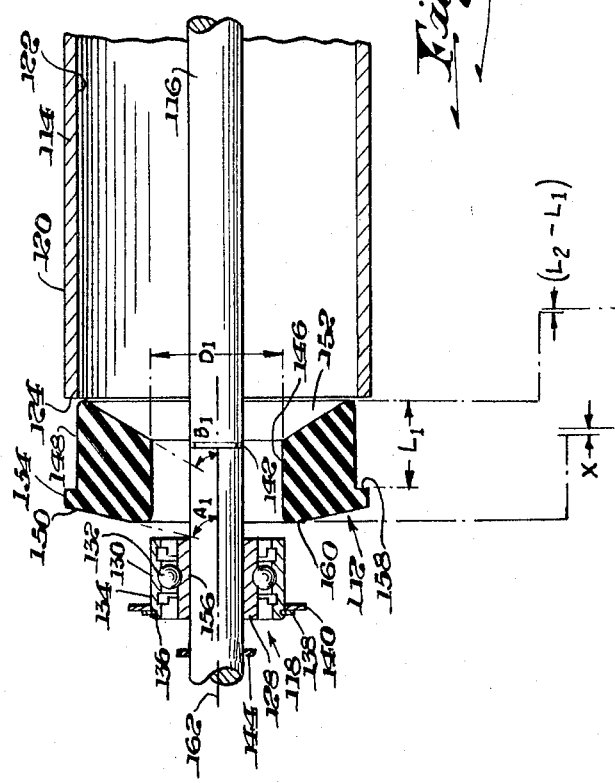
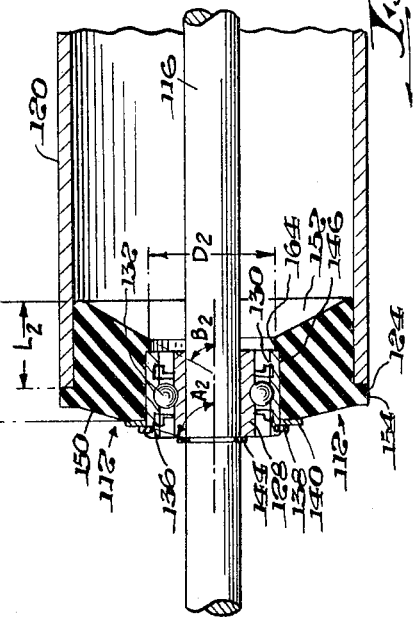
INVENTOR.
WILLIAM N. POUNDSTONE.
BY Stanley J Punch
his ATTORNEY United States Patent Office 3,267,758
Patented August 23, 1966

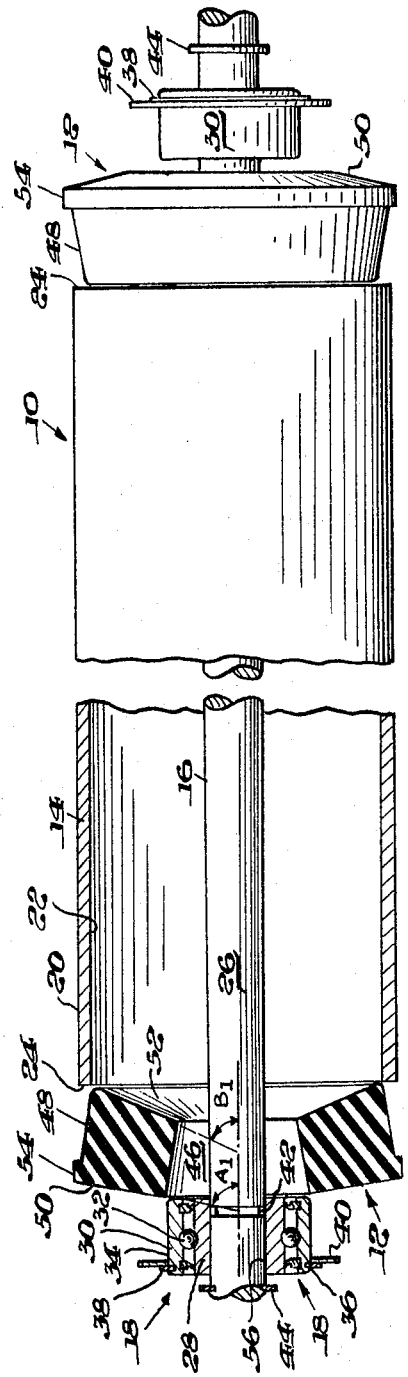

3,267,758
IDLER ROLLERS AND METHOD OF
MAKING THE SAME
William N. Poundstone, Morgantown, W. Va., assignor to
Consolidation Coal Company, Pittsburgh, Pa., a corporation of Pennsylvania
Filed Dec. 7, 1964, Ser. No. 416,533
10 Claims. (Cl. 74—230.4)

This application is a continuation-in-part of my copending application Serial Number 187,117, filed April 12, 1962, now abandoned, and entitled "Idler Rollers and Method of Making the Same." The above copending application is in turn a continuation-in-part of several other applications identified therein.

This invention relates generally to idler roller assemblies and their components and more particularly to idler roller assemblies which are adapted to support an endless conveyor belt.

This invention is directed to improved idler roller assemblies of the type which are utilized to support the belt of the belt conveyor. The idler rollers of the present invention are designed for ease of assembly, shock resistance, and simplicity of manufacture.

In the idler roller assemblies of the present invention, at least a portion of the radial distance between the roller shaft and the tubular roller member is occupied by an annular resilient member which is, upon assembly of the roller, distorted to maintain the outer tubular roller in fixed, concentric relation to some central member. The distorted resilient member between the central member and the outer tubular roller permits ease of assembly of the roller and also provides shock resistance to the assembly. As will be described in detail hereinafter, the rollers of the present invention that utilize resilient supporting members to support the tubular roller differ from all other rollers previously designed and constructed in that the annular resilient members of the present invention are designed to be initially distorted upon assembly of the roller and to be maintained in a distorted condition while the roller remains assembled. This type of assembly serves to facilitate initial assembly of the roller and to facilitate disassembly of the roller for repair or inspection of the roller components.

In order to appreciate some of the advantages of the present invention, it must be remembered that conventional conveyor idler rollers structurally include a tubular roller, a roll shaft extending coaxially through the tubular roller, and a pair of metallic dish shaped end walls or end bells which maintain the roll shaft in coaxial relation with the tubular roller. The dish shaped end walls usually have a bearing carrier depression therein which is arranged to support the bearing assembly. The tubular rollers, of necessity, must have a machined inner cylindrical surface adjacent their ends to facilitate the proper fitting of the dish shaped end walls therein. The end walls must be formed to close tolerances or properly machined so that they will fit within the tubular roller inner surface and maintain the roll shaft in coaxial relation with the tubular roller. It is the usual procedure to fixedly secure the end walls in the tubular roller by a circumferential weld. This method of fabrication and assembly is both expensive and time consuming due to the machining required and the securing of the end walls to the tubular roller. Further, because of the circumferential weld, the roller assembly is not readily dimantleable, and it is not economically feasible to replace either a damaged tubular roller or the roll shaft. The conventional practice is to replace the entire roller upon any damage to any of its component parts.

Further, because of the structural arrangement, the connection between the roll shaft and the idler roller transmits any shock load experienced by the tubular roller directly to both the bearings and the roll shaft. This feature, when the conveyor roller is subjected to shock loads from large or heavy pieces of material striking the tubular roller, results in damage to the bearing assemblies.

In the conventional roller there is metal-to-metal contact between the tubular roller and the outer bearing races so that it is necessary to employ the same type of metal for both the roller and the bearing race. It has been the desire of the industry for many years to provide idler rollers with a light aluminum tubular roller and a sturdy steel roll shaft with the steel bearing assemblies thereon. The aluminum roller is desirable because of its light weight. Due to the metal-to-metal contact between the bearings and the tubular roll, the use of aluminum and steel resulted in electrolytic decomposition of the lighter metal. The present invention, however, provides for insulation of the tubular roller from the bearing races so that no electrolytic decomposition may result if dissimilar metals are utilized for the roller and the bearing races.

The present invention further provides an idler roller assembly in which the tubular roller may be formed from a length of standard pipe. A shaft is coaxially positioned within the tubular roller and a pair of roller mounting assemblies maintain the tubular roller on the shaft in coaxial relation thereto. The roller mounting assemblies include a resilient annular support member which is distorted to maintain the roller on the shaft. With the present invention, it is now possible to fabricate and assemble idler rollers at the job site with standard tubular pipe and cylindrical shafts. The only specially fabricated elements required are the resilient annular support members.

The annular resilient supporting members that support the tubular roller are distorted by a compressive force applied axially so that the external surfaces of the supporting members are forced into frictional engagement with the cylindrical internal surface of the tubular roller. The distortion of the annular resilient supporting member also causes the internal surface of the supporting member to be forced into frictional engagement with the cylindrical outer race of the bearing. In the preferred construction of the annular resilient supporting members, the supporting members have frusto conical end walls. Because of these frusto conical end walls, the degree of distortion desired is easily obtained by exerting a relatively small axial force on the annular resilient supporting member adjacent its internal surface. In fact, the resilient supporting members with the frusto conical end walls appear to exhibit the properties of a toggle joint in that a relatively small axial force at the center of the resilient supporting member exerts an end-wise force along the circumference of the supporting member to frictionally engage the supporting member external surface to the cylindrical internal surface of the tubular roller member.

In the roller assemblies of the present invention wherein the rotatable roller is mounted on a fixed shaft, the axial force to distort the annular resilient supporting members is transmitted through the bearings themselves. Thus, when the idler roller is subject to axial thrust loads, for example by lateral movement of the conveyor belt which it supports, or by the end portion of the shaft striking the ground as by accidentally dropping the roller or the like, the increased axial force on the resilient supporting members increases the frictional engagement between the supporting members, the bearing assembly outer race, and the tubular roller internal cylindrical surface. It should be noted that axial distortion of the annular resilient supporting member does not interfere with proper bearing operation.

With the foregoing consideration in mind, it is a principal object of the present invention to provide an idler roller assembly that is quickly and easily assembled.

Another object of the present invention is to provide an idler roller assembly which includes means to absorb shock loads experienced by the tubular roller without transmitting those shock loads to the bearing assembly.

Another object of this invention is to provide a method of quickly and inexpensively assembling an idler roller with components that may be easily replaced.

Another object of this invention is to provide an idler roller which may be easily disassembled to replace damaged components.

Another object of this invention is to provide an annular, resilient supporting member which undergoes a controlled distortion that enables it to support a tubular roller having a cylindrical internal surface relative to a central member having a cylindrical external surface.

Another object of this invention is to provide an annular, resilient supporting member which clampingly engages a tubular roller having a cylindrical internal surface and a central member having a cylindrical external surface, when distorted by an axial force supplied adjacent the internal surface of the supporting member.

These and other objects of the present invention will become apparent as this description proceeds in conjunction with the accompanying drawings.

In the drawings:

FIGURE 1 is a longitudinal view, partially in section, illustrating the idler roller in a disassembled state and the annular resilient supporting member in an undistorted state.

FIGURE 2 is a longitudinal section similar to FIGURE 1 illustrating the assembled idler roller and the annular resilient supporting member in its distorted state.

FIGURE 3 is a view, partially in section, similar to FIGURE 1 illustrating an idler roller with a slightly modified annular resilient supporting member in its substantially undistorted state.

FIGURE 4 is a view similar to FIGURE 3 illustrating the assembled idler roller with the annular resilient supporting member in its distorted state.

EMBODIMENT OF FIGURES 1 AND 2

Referring to the drawings and particularly to FIGURES 1 and 2, a preferred form of the idler roller assembly generally designated by the numeral 10 is illustrated in its disassembled condition in FIGURE 1 and assembled in FIGURE 2. The idler rollers of FIGURES 1 and 2 are partially in section to illustrate the manner in which the annular resilient supporting member generally designated by the numeral 12 is positioned within the tubular roller member. The opposite end of the idler roller is illustrated in full and similar numeral designations will be given to similar parts on opposite ends of the ider roller assembly 10.

The idler roller assembly 10 includes a tubular roller member 14 with a shaft 16 coaxially positioned therein. A pair of annular bearing assemblies generally designated by the numeral 18 are mounted on the ends of the shaft 16 and a pair of annular resilient supporting members generally designated by the numeral 12 are coaxially mounted on the shafts and coaxially support the tubular roller member 14 on the shaft 16 with the bearing assemblies 18 therebetween.

Referring in greater detail to the components of the idler roller assembly 10, the tubular roller member 14 has a cylindrical outer surface 20, a cylindrical inner surface 22 and opposite end portions 24. The shaft 16 has a cylindrical external surface 26 and the bearing assemblies 18 have an inner race 28 and an outer race 30 with bearing elements 32 therebetween. The inner race 28 has an internal bore 56 that fits snugly over the external surface of shaft 16. The annular outer race 30 has an external cylindrical surface 34 with an annular recessed portion 36 that receives a snap ring 38. The snap ring 38 is arranged to limit axial movement of an annular back up ring 40 positioned on the external surface of the bearing outer race 30.

The shaft 16 has a pair of snap ring receiving recessed portions or grooves 42 therein located adjacent the ends of the tubular roller 14 at a preselected dimension from each other, so that the annular resilient supporting members 12 may be properly distorted as will be later discussed. A pair of snap rings 44 are positioned on the shaft 16 and are arranged to be positioned in the snap ring receiving grooves 42 when the roller assembly 10 is in an assembled condition.

The annular resilient supporting member 12 is formed of rubber or other like resilient material and has in its relaxed or undistorted condition a frusto conical internal surface 46, a frusto conical external surface 48, a frusto conical convex outer end wall 50 and a frusto conical concave inner end wall 52. An annular flange 54, which serves as a means to limit inward axial movement of the annular resilient supporting member 12 relative to the tubular roller member 14, extends around the external surface 48 adjacent the convex outer end wall 50. The annular resilient supporting member 12 is so formed that the frusto conical internal surface 46 has a maximum diameter approximately equal to the diameter of the bearing outer race 30 over which the annular resilient supporting member 12 is to be positioned. The frusto conical external surface 48 has a minimum diameter approximately equal to the diameter of the tubular roller member inner cylindrical surface 22 within which the annular resilient supporting member 12 is to be placed.

As seen in FIGURE 1, the apex angle $A_1$ of the undistorted frusto conical end wall 50 and the apex angle $B_1$ of the undistorted frusto conical concave inner end wall 52 are indicated. The apex angle may be defined as the angle that any element of the frusto conical surface, when extended, makes with the axis of the frusto conical surface.

In FIGURE 1 the idler roller assembly 10 is illustrated in a disassembled condition with the pair of annular resilient supporting members 12 positioned adjacent to the tubular roller opposite end portions 24. The pair of bearing assemblies are illustrated positioned adjacent to the annular supporting member frusto conical convex end walls 50. The shaft 16 is illustrated as extending through the annular resilient support members 12 and the bearing assemblies 18.

To assemble the idler roller components, the bearing assemblies 18 are first inserted within the annular resilient supporting member 12 until the backup washer 40 abuts the annular resilient supporting member concave end walls, as is illustrated in FIGURE 2. The shaft 16 is then positioned within the tubular roller member 14 in coaxial relation therewith. The sub-assembly of the annular resilient supporting members 12 with the bearing assemblies 18 positioned therein is forced into the tubular roller 14. The tubular roller 14 deforms the outer frusto conical surface 48 of the annular resilient supporting members 12 and the supporting member flange 54 abuts the tubular roller member end portion 24 to limit inward movement of the annular resilient supporting members 12 relative to the tubular roller member 14. The backup washer 40 limits the inward movement of the bearing assembly relative to the annular resilient supporting member 12. The same assembly of the component parts is accomplished at both ends of the tubular roller member 14 to thereby coaxially support the tubular roller member 14 on the shaft 16.

When the bearing assemblies 18 are in place within the annular resilient supporting members 12 and the members 12 are positioned within the tubular roller 14 with the annular flange portions 54 abutting the respective tubular roller member opposite end portions 24, the distance between the grooves 42 formed on the shaft 16 will be such that the grooves will lie at approximately the axial position that the respective bearing assemblies will occupy on the shaft. An axial force is then exerted on the inner race 28 of both of the bearing assemblies 18 to force the bearing assemblies toward each other. The axial forces exerted on the bearing assemblies 18 cause a distortion in the annular resilient supporting members 12 and thereby move the bearing assemblies 18 inboard of the grooves 42 formed in the shaft 16. While the axial force is maintained on the bearing assemblies 18, the snap rings 44 are positioned in the snap ring grooves 42. When the axial forces are relaxed, the snap rings 44 retain the bearing assemblies on the shaft 16. The snap rings 44 continue, however, to urge the bearing assemblies toward each other against the axial deforming force of the pair of annular resilient supporting members 12.

The axial forces that serve to move the bearing assemblies 18 inboard of the grooves 42 on shaft 16 cause the annular resilient supporting members 12 to be distorted so that each of the distorted supporting members 12 more forcefully engages the tubular roller internal surface 22 and more forcefully engages its respective bearing outer race cylindrical external surface 34.

As may be seen by comparing the annular resilient supporting member 12 illustrated in section in FIGURES 1 and 2 in both a distorted and undistorted condition, the resilient supporting member 12 upon distortion changes dimension. The distortion of the annular resilient supporting member 12 is controlled by its particular shape and the material from which it is formed. Since the flanges 54 restrain inward axial movement of the supporting members 12 adjacent the outer surface 48 and since the inward axial force is exerted adjacent the inner annular supporting member inner surface 12 by backup washer 40 that is retained by snap ring 36, the supporting members 12 are in axial shear between the surfaces 48 and 46 when distorted as shown in FIGURE 2. When in the distorted condition of FIGURE 2, the apex angles of the frusto conical end walls 50 and 52 are increased. For comparison with FIGURE 1, a conical element of each of the surfaces 50 and 52 has been projected to the axes of the surfaces on FIGURE 2. These apex angles $A_2$ and $B_2$ respectively may be compared with the apex angles $A_1$ and $B_1$ of the undistorted resilient member 12 shown in section in FIGURE 1. The comparison will show that angle $A_2$ is greater than angle $A_1$ and that angle $B_2$ is greater than angle $B_1$. This illustrates that the resilient supporting member 12 tends to flatten when an axial force is exerted to distort it to the assembled position illustrated in FIGURE 2.

Referring again to FIGURE 1, the apex angle $A_1$ of the convex outer surface 50 is greater than the apex angle $B_1$ of the frusto conical concave inner surface 52. This difference in apex angles between the frusto conical surfaces 50 and 52 causes the axial dimension of the annular resilient supporting member 12 as measured from surface 50 to the surface 52 to be greater adjacent the outer surface 48 than it is adjacent the inner surface 46. Thus, a greater mass of material of the supporting member 12 is concentrated radially outwardly than is concentrated toward the center of the annular resilient supporting member. This difference in concentration of mass facilitates distortion of the supporting member when an axial force is applied adjacent the inner surface 46.

Further details of the manner in which the annular resilient member 12 distorts and changes dimension will be set forth in connection with the description of the embodiment illustrated in FIGURES 3 and 4. The embodiment of FIGURES 1 and 2 differs from that of FIGURES 3 and 4 only in that the surfaces 46 and 48 are frusto conical in their undistorted condition, whereas the corresponding surfaces in the embodiment of FIGURES 3 and 4 are cylindrical. The frusto conical surfaces 46 and 48 cause some predistortion to the annular resilient member 12 before an axial force is applied thereto thereby causing the annular surfaces 46 and 48 to more forcefully clamp the adjacent surfaces of the bearings and tubular roller respectively after the application of an axial force to distort the annular resilient member 12.

EMBODIMENT OF FIGURES 3 AND 4

Referring to FIGURE 3, another embodiment of an idler roller assembly generally designated by the numeral 110 is illustrated in its disassembled condition. Since the components of the idler roller assembly 110 illustrated in FIGURES 3 and 4 are substantially the same as the components illustrated in FIGURES 1 and 2, the same numerical designations increased by 100 will be employed to designate similar parts in the embodiment illustrated in FIGURES 3 and 4.

FIGURE 3 illustrates the idler roller 110 in disassembled condition with the annular resilient supporting members 112 in an undistorted condition. In this undistorted condition, the supporting member 112 has a cylindrical external surface 148 and a cylindrical internal surface 146. The surfaces 148 and 146 are coaxial and are dimensioned so that the external cylindrical surface 148 is contiguous to the internal surface 122 of the tubular roller member 114 and the cylindrical internal surface 146 is contiguous to the external surface 134 of the bearing outer annular race 130.

The resilient supporting member 112 has a frusto conical convex outer end wall 150 and a frusto conical concave inner end wall 152. The frusto conical convex outer wall 150 has a radially extending flange portion 154 formed adjacent thereto. The flange portion 154 has a planar annular shoulder 158 formed thereon which is arranged to abut the tubular roller member end portion 124. Adjacent the cylindrical internal surface 146 of the resilient supporting member 112 the frusto conical convex outer end wall 150 terminates in a planar end wall portion 160 that extends in planes which are normal to the axis 162 of the coaxial cylindrical surfaces 147 and 148. The apex angle $A_1$ of the undistorted frusto conical convex outer end wall 150 and the apex angle $B_1$ of the undistorted frusto conical concave inner end wall 152 are indicated on FIGURE 3. The apex angle may be defined as the angle that any element of the frusto conical surface, when extended, makes with the axis of the surface. Axis 162 of the cylindrical surfaces 146 and 148 is also the axis of the frusto conical surfaces 150 and 152 so that apex angles $A_1$ and $B_1$ are the angles that any conical element, when extended, of the frusto conical surfaces 150 and 152 respectively, make with the axis 162.

The annular resilient supporting member 112 is shown in FIGURE 4 as it would appear when assembled in the idler roller assembly 110. The tubular roller 114 is supported by a pair of annular resilient supporting members 112. The outer race 130 of the bearing assembly 118 is supported by the supporting member 112. The bearing assembly 118 has an inner race 128 which is slidingly positioned over the shaft 116. The shaft 116 has a pair of annular grooves 42 (only one of which is illustrated in FIGURES 3 and 4) so that when a force is exerted to distort the annular resilient supporting members 112 they are retained in the distorted condition by snap rings 144 that are positioned in the respective grooves 142. Both of the bearings 118 have a snap ring groove 136 that retains a snap ring 138 therein. The snap ring restrains axial movement of a backup washer 140 when the idler roller is assembled.

The pair of undistorted supporting members 112, one of which is shown in section in FIGURE 3, for assembly are placed within the tubular roller 114. The bearing assemblies 118 are placed on the shaft 116 and within the respective supporting members 112, as illustrated in FIGURE 4. The bearing assemblies 118 are so positioned that the backup washers 140 axially abut the planar annular end wall portion 160 of the frusto conical convex outer end walls 150. The annular resilient supporting members are then placed within the tubular roller 114 so that the planar shoulders 158 formed on the flange portion 154 abut the respective roller member opposite end portions 124. With the annular resilient members 112 so positioned, the cylindrical internal surfaces 146 have an undistorted diameter $D_1$. Likewise, the length of the cylindrical external surfaces 148 as measured from the annular shoulder 158 to the end of the respective supporting member 112 is indicated by $L_1$ in the relaxed or undistorted condition in FIGURE 3.

Referring to FIGURE 4, which illustrates the idler roller assembly 110 in an assembled form, the supporting members 112 are distorted by axial forces that have been exerted on the bearing assemblies 118 to cause the bearing assemblies to move inwardly on the shaft 116 toward each other so that the respective snap rings 144 can be inserted in the annular grooves 142 on the shaft. For comparison, the shaft 116 and the tubular roller 114 are in exactly the same relative positions in FIGURES 3 and 4, that is, the axial distance measured between the groove 142 on shaft 116 and the tubular roller end portion 124 is the same in both FIGURE 3 and FIGURE 4. Accordingly, since the bearing assembly 118 has been moved inwardly into assembled position in FIGURE 4 until the snap ring 144 can be inserted in groove 142, there is a total movement of the bearing assembly 118 relative to the annular resilient supporting member 112 an amount indicated between FIGURES 3 and 4.

Since the bearing assemblies 118 axially contact the annular resilient supporting members 112 through the annular backup washers 140, the forces which moved the bearing assemblies 118 axially inwardly on the shaft 116 are the axial forces exerted on the respective supporting members 112 which distorted the supporting members 112 as viewed in FIGURE 4. The movement of the bearing assemblies 118 is controlled by the distance between the annular grooves 142 for the snap rings 144 on shaft 116. The distortion of the resilient supporting members 112 is controlled by their particular shape and the material from which they are formed.

As seen in FIGURE 4, particularly the portion of FIGURE 4 illustrated in section, when an axial force is exerted on the frusto conical end wall 150 adjacent the cylindrical internal surface 146 of supporting member 112, the resilient supporting member 112 distorts and changes dimension. Since the flange 158 restrains inward axial movement of the supporting member 112 adjacent the cylindrical external surface 150 and since the inward axial force is exerted adjacent the cylindrical internal surface 146, the supporting member 112 is in axial shear between the surfaces 148 and 146 when distorted as illustrated in FIGURE 4. At the same time, the cylindrical external surface 148 elongates to a distorted dimension $L_2$, as shown in FIGURE 4. The diameter $D_2$ of the distorted supporting member 112 becomes smaller wherever it is not contacted by the bearing outer race 130 so that a protruding portion 164 appears to move radially inwardly around the end of the bearing outer race 130.

When in the distorted condition of FIGURE 4, the average apex angles of the frusto conical end walls 150 and 152 are increased. The term "average apex angle" is utilized since the surfaces 150 and 152 may no longer remain truly frusto conical, but rather may protrude slightly so that there is a slight curvature to the conical elements of the frusto conical surfaces. For comparison with FIGURE 3 a point radially midway between the cylindrical internal surface 146 and the cylindrical external surface 148 has been selected and tangents to the distorted surfaces 150 and 152 have been projected to the axis 162 of FIGURE 4. These average apex angles indicated by $A_2$ and $B_2$ may be compared with the true apex angles $A_1$ and $B_1$ shown in FIGURE 3. The comparison will show that the average apex angle $A_2$ is greater than the apex angle $A_1$, and the average apex angle $B_2$ is greater than apex angle $B_1$. This indicates that the resilient supporting member 112 tends to flatten when an axial force is exerted to distort it to the position of FIGURE 4.

Referring to FIGURE 3, the apex angle $A_1$ of the frusto conical outer surface 150 is greater than the apex angle $B_1$ of the frusto conical concave inner surface 152. This difference in apex angles between the frusto conical surface 150 and the frusto conical surface 152 causes the axial dimension of the annular resilient supporting member 112 from the surface 150 to the surface 152 to be greater adjacent the external cylindrical surface 148 than it is adjacent the internal cylindrical surface 146. Thus, more material of the annular resilient supporting member 112 is concentrated radially outwardly than is concentrated toward the center of the supporting member. This difference in concentration facilitates distortion of the supporting member when an axial force is applied adjacent the cylindrical internal surface 146. The annular resilient supporting member of FIGURES 3 and 4 provides effective clamping support between the bearing outer race 134 and the tubular roller 114. The resiliency of the annular support member 112 also serves to cushion any shock loads transmitted to the bearings from the tubular roller 114. In the roller assembly, the support members 112 permit quiet operation of the assembly and the flange members 154 serve to protect the tubular roller end portions 124.

Resilient supporting members 112 having cylindrical external surfaces 148 with a diameter of 3.75 inches have proved highly effective when formed from a neoprene rubber having a durometer hardness of about 80. It will be appreciated that the hardness of the annular supporting members 112 can be varied for varying sizes and for various uses to which the idler roller assemblies may be put.

While neoprene rubber is a successful material for utilization in the annular support members 112, other resilient materials may be utilized to form supporting members having the characteristics described herein and hereinafter claimed without departing from the scope of the present invention.

It will be seen that the idler roller assemblies herein described provide for simple, economically constructed units. The many advantages attributable to these rollers make them highly efficient idler roller assemblies.

According to the provisions of the patent statutes, the principle, preferred construction, and mode of operation of the invention have been explained and what is considered to represent its best embodiments have been illustrated. However, it should be understood that, within the scope of the appended claims, the invention may be practiced otherwise than as specifically illustrated and described.

I claim:
1. An idler roller assembly comprising,
a tubular roller member having a cylindrical outer surface, a cylindrical inner surface and opposite end portions,
a shaft, said shaft coaxially positioned within said tubular member,
a pair of annular bearing assemblies coaxially mounted on said shaft within said tubular roller member and adjacent said tubular roller opposite end portions, said bearing assemblies each having an inner race, an outer race and bearing elements therebetween,
a pair of annular resilient support members coaxially mounted on said shaft adjacent said respective roller member opposite end portions and between said respective annular bearing assemblies and said roller member cylindrical inner surface,
said annular resilient support members coaxially supporting said roller member on said bearing assemblies and maintaining said bearing assemblies at a predetermined spaced relation to each other and adjacent to said tubular roller member opposite end portions, said annular resilient support members each having an external surface, an internal surface, a substantially frusto conical concave end wall and a substantially frusto conical convex end wall, said pair of annular resilient support members mounted on said shaft with said substantially frusto conical concave end walls facing each other, said pair of annular resilient support members mounted on said shaft in spaced relation to each other with their respective external surfaces abutting said roller member cylindrical internal surface adjacent said tubular roller member end portion, each of said annular support members having their internal surfaces abutting an external surface of a bearing assembly outer race, stop means restraining axial movement of said annular resilient support members toward each other, said pair of annular resilient support members restraining axial movement of said bearing assemblies toward each other, and securing means to axially retain said bearing assemblies on said shaft, said securing means urging said bearing assemblies toward each other and exerting an axial deforming force on both of said annular resilient support members to thereby distort said annular resilient support members and urge said annular resilient support member external surfaces into frictional engagement with said tubular roller member cylindrical inner surface and urge said annular resilient support member internal surfaces into frictional engagement with said respective bearing assembly outer race external surface.

2. An idler roller assembly as set forth in claim 1 in which said stop means includes an annular shoulder portion on said external surface of each of said annular resilient support members, said annular resilient support members positioned within said tubular roller member with said annular shoulder portions abutting said respective tubular roller member end portion thereby restraining axial movement of said annular resilient support members toward each other.

3. An idler roller assembly as set forth in claim 1 in which said securing means to axially retain said bearing assembly on said shaft includes on each bearing assembly outer race, an annular shoulder member extending radially therefrom, said annular shoulder member abutting said respective annular resilient support member convex end wall adjacent said annular resilient support member inner surface so that said respective annular shoulder member restrains axial movement of said bearing assemblies toward each other.

4. An idler roller assembly as set forth in claim 1 in which said securing means includes a pair of spaced annular shoulders on said shaft, said shoulders positioned on said shaft at a dimension less than the dimension between the convex end walls of said annular resilient support members mounted on said shaft adjacent said roller member annular end walls, said annular shoulders abutting said respective bearing assembly inner race and exerting a distorting force through said bearing assemblies on said annular resilient support members to urge said annular resilient support member external surfaces into frictional engagement with said tubular roller member internal cylindrical wall and said annular resilient support member internal surfaces into frictional engagement with said bearing assembly outer race external surface.

5. An idler roller assembly as set forth in claim 1 in which said securing means includes a pair of annular recessed portions in said shaft, said recessed portions arranged in spaced relation to each other at a dimension less than the dimension between the convex end walls of said annular resilient support members mounted on said shaft adjacent said roller member opposite end portions, and a pair of ring members positioned in said recessed portions in abutting relation with said bearing assembly inner race and through said bearing assemblies distorting said annular resilient support members to urge said annular resilient support member external surfaces into frictional engagement with said tubular roller member internal cylindrical surface and said annular resilient support member internal surfaces into frictional engagement with said bearing assembly outer race external surface.

6. An idler roller assembly as set forth in claim 1 in which, prior to assembly, said pair of annular resilient support members includes a conical external surface and a conical internal surface.

7. An idler roller assembly as set forth in claim 1 in which, prior to assembly, said pair of annular resilient support members includes a conical external surface, the minimum diameter of which is substantially equal to the diameter of said tubular roller member cylindrical inner surface, and in which, prior to assembly, said pair of annular resilient support members includes a conical internal surface the minimum diameter of which is substantially equal to the diameter of said bearing assembly outer race external surface.

8. An idler roller assembly as set forth in claim 1 in which, prior to assembly, said pair of annular resilient support members has a cylindrical external surface the diameter of which is substantially equal to the diameter of said tubular roller member cylindrical inner surface, and in which, prior to assembly, said pair of annular resilient support members has a cylindrical internal surface the diameter of which is substantially equal to the diameter of said bearing assembly outer race external surface.

9. An idler roller assembly as set forth in claim 1 in which said pair of annular resilient support members in an assembled distorted position has an axial dimension greater than the axial dimension in an undistorted position prior to assembly.

10. An idler roller assembly as set forth in claim 1 in which said annular resilient support members in an assembled distorted position are in axial shear.

References Cited by the Examiner

UNITED STATES PATENTS

| 2,169,625 | 8/1939 | Weiss et al. |
| 3,097,022 | 7/1963 | Sernetz _____ 308—20 |

FOREIGN PATENTS

| 1,208,000 | 9/1959 | France. |
| 818,901 | 8/1959 | Great Britain. |

FRANK SUSKO, *Primary Examiner.*

DAVID J. WILLIAMOWSKY, *Examiner.*

J. A. WONG, *Assistant Examiner.*